(12) United States Patent
Halbert

(10) Patent No.: US 8,406,140 B2
(45) Date of Patent: Mar. 26, 2013

(54) NETWORK DEVICE INVENTORY SYSTEM

(75) Inventor: Scott Halbert, Huntersville, NC (US)

(73) Assignee: Wal-Mart Stores, Inc., Bentonville, AR (US)

( * ) Notice: Subject to any disclaimer, the term of this patent is extended or adjusted under 35 U.S.C. 154(b) by 926 days.

(21) Appl. No.: 11/842,446

(22) Filed: Aug. 21, 2007

(65) Prior Publication Data

US 2008/0049644 A1 Feb. 28, 2008

Related U.S. Application Data

(60) Provisional application No. 60/823,206, filed on Aug. 22, 2006.

(51) Int. Cl.
*G01R 31/08* (2006.01)
*H04L 12/28* (2006.01)
*H04L 12/66* (2006.01)
*H04W 4/00* (2009.01)

(52) U.S. Cl. ......... 370/241; 370/254; 370/338; 370/352

(58) Field of Classification Search .......... 370/254–255; 705/56; 709/224–225, 229; 726/26
See application file for complete search history.

(56) References Cited

U.S. PATENT DOCUMENTS

| | | | |
|---|---|---|---|
| 7,454,482 B2 * | 11/2008 | Barnard et al. | 709/220 |
| 2003/0051236 A1 | 3/2003 | Pace et al. | |
| 2003/0069949 A1 | 4/2003 | Chan et al. | |
| 2003/0074360 A1 | 4/2003 | Chen et al. | |
| 2003/0120822 A1 | 6/2003 | Langrind et al. | |
| 2003/0131084 A1 | 7/2003 | Pizzorni et al. | |
| 2003/0140111 A1 | 7/2003 | Pace et al. | |
| 2003/0154266 A1 | 8/2003 | Bobick et al. | |
| 2003/0200296 A1 | 10/2003 | Lindsey | |
| 2003/0217137 A1 | 11/2003 | Roese et al. | |
| 2003/0225893 A1 | 12/2003 | Roese et al. | |
| 2003/0229686 A1 | 12/2003 | Kortright | |
| 2003/0229890 A1 | 12/2003 | Lau et al. | |
| 2004/0128370 A1 | 7/2004 | Kortright | |
| 2004/0172412 A1 | 9/2004 | Files et al. | |
| 2005/0114880 A1 * | 5/2005 | Gould | 725/25 |
| 2005/0243730 A1 * | 11/2005 | Williamson et al. | 370/241 |
| 2005/0265319 A1 * | 12/2005 | Clegg et al. | 370/352 |
| 2006/0140165 A1 * | 6/2006 | Koodli et al. | 370/338 |
| 2006/0179131 A1 * | 8/2006 | Courtney | 709/220 |

FOREIGN PATENT DOCUMENTS

| | | |
|---|---|---|
| EP | 1 300 983 A2 | 4/2003 |
| WO | WO 03/075125 A2 | 9/2003 |

OTHER PUBLICATIONS

Omojokun, Olufisayo et al., "A High-Level and Flexible Framework for Dynamically Composing Networked Devices", Proceedings of the Fifth IEEE Workshop on Mobile Computing Systems & Applications (WMCSA 2003), Oct. 9, 2003-Oct. 10, 2003, 2003 IEEE, #0-7695-1994-4/03, pp. 160-169.

Lin, Hwa-Chun et al., "Automatic Link Layer Topology Discovery of IP Networks", International Conference on Communications, Vancouver, British Columbia, Jun. 6, 1999-Jun. 10, 1999, 1999 IEEE #0-7803-5284-X99, vol. 2, pp. 1034-1038.

(Continued)

*Primary Examiner* — Brandon Renner
(74) *Attorney, Agent, or Firm* — Wood, Herron & Evans, LLP

(57) ABSTRACT

A network device identification process and system where a centralized global master is coupled to multiple local masters that locally retain a portion of the data from the global master, and that coordinate the dynamic performance of discovery and identification processes within the domains assigned to those local masters. The processes identify and validate devices on the network.

26 Claims, 8 Drawing Sheets

OTHER PUBLICATIONS

Iwai, Masayuki et al., "Dragon: Soft Real-Time Event Delivering Architecture for Networked Sensors and Appliances", Proceedings of the Seventh International Conference on Real-Time Computing Systems and Applications, 2000, Dec. 12, 2000-Dec. 14, 2000, Cheju Island, 2000 IEEE #1530-1427/00, pp. 425-432.

Martinez, A.E. et al., "Interact-DDM A Solution for the Integration of Domestic Devices on Network Management Platforms", IFIP/IEEE Eighth International Symposium on Integrated Network Management, 2003, Mar. 24, 2003-Mar. 28, 2003, pp. 485-488.

De Paula Bianchin, Calebe et al., "MoDPAI: an Intelligent Network Devices Management Tool", First IEEE Consumer Communications and Networking Conference, CCNC 2004, Jan. 5, 2004-Jan. 8, 2004, pp. 654-656.

Hewlett-Packard Company, "HP Open View Inventory Manager Using Radia", Radia Inventory Manager Guide, Server Software Version: 4.0, Client Software Version: 3.1 for the UNIX operating system, Manufacturing Part Number: T3424-90049, Hewlett-Packard Development Company, L.P. (Sep. 2004), pp. 1-25.

* cited by examiner

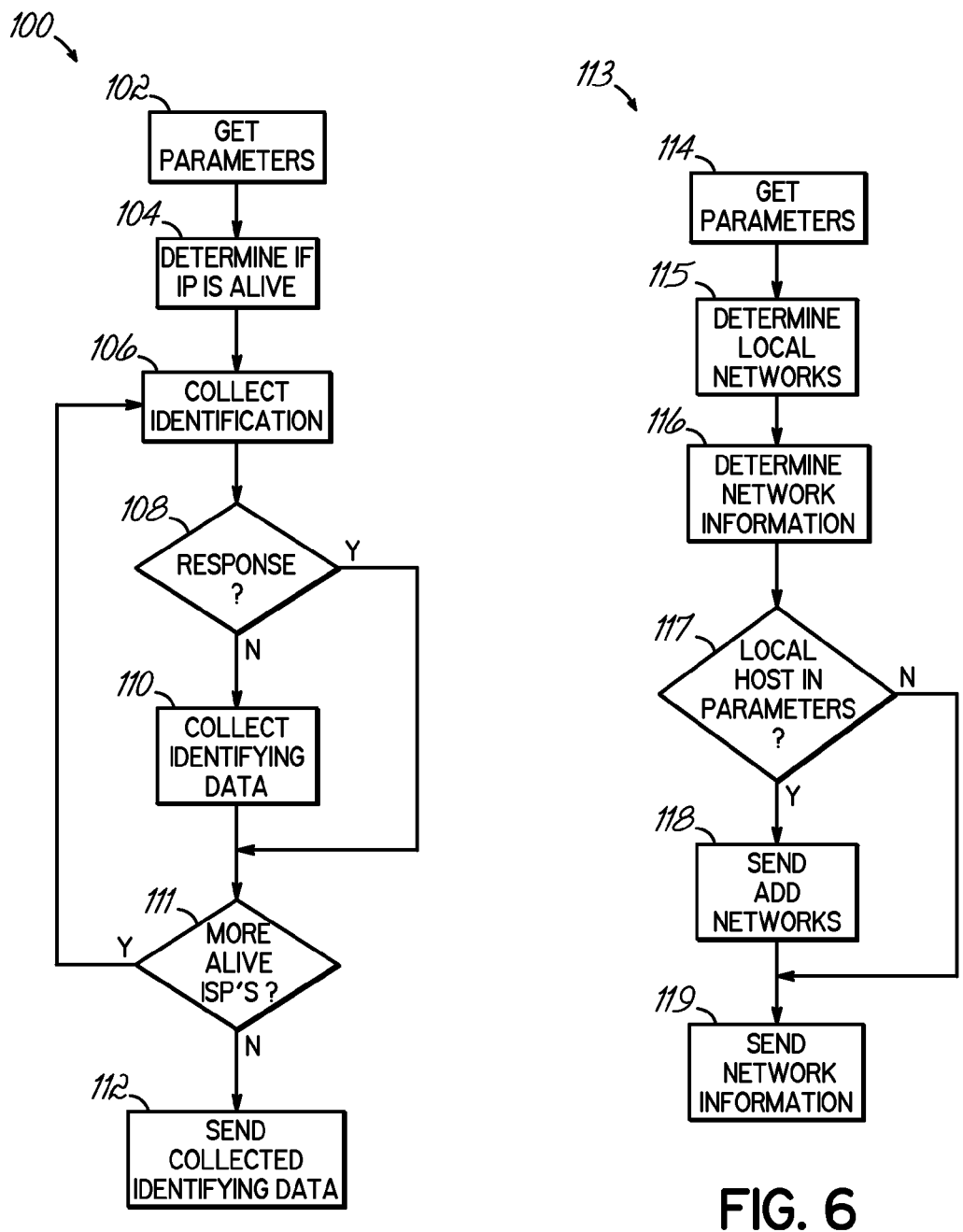

NETWORK DEVICE INVENTORY SYSTEM

CROSS-REFERENCE TO RELATED APPLICATIONS

This application claims the benefit of the filing date of U.S. Provisional Patent Application No. 60/823,206, entitled "NETWORK DEVICE INVENTORY SYSTEM", filed on Aug. 22, 2006 by Scott Halbert. The entire disclosure of that provisional U.S. patent application is incorporated into this application by reference.

FIELD OF THE INVENTION

The present invention generally relates to distributed computer systems, and more particularly, to managing computing resources within a distributed computer environment.

BACKGROUND OF THE INVENTION

Computer networking provides vital efficiency for private, government and commercial enterprises. Distributive computer networks can globally interconnect a virtually limitless number of electronic devices to facilitate efficient communications. To effectively manage devices and tasks within a network, distributive network operators must diligently work towards ensuring network integrity. For example, network administrators must react to error messages indicative of the failure of a device or connection, or of the presence of an unauthorized device on the network. Delays in reacting to a failed or unauthorized network device can result in an increased loss of connectivity, network damage and compromise to confidential data, among other concerns.

Challenges associated with ensuring network integrity compound as the sizes of networks expand. Large networks lack a mechanism for efficiently knowing that all of the devices on a network are functioning properly. While discovery protocols have been developed to assist with identifying connected devices, many conventional discovery protocols also have the potential for causing software damage. For instance, a conventional protocol can lock up a system if it attempts to detect an open port using an unexpected protocol. Other protocols may work on a small scale, however, they often do not scale well in a world-wide type network. As such, most networks are reactive in nature, addressing problems only after their discovery, e.g., when a crucial device fails to respond correctly, or an unauthorized device has already compromised the system.

As such, there is no mechanism for dynamically tracking all devices on a network in a transparent, non-intrusive and non-damaging fashion. Relatedly, no known protocol can effectively verify that identified devices are approved for use on a network. Absent such detection processes, networks remain vulnerable to intrusion, compromise and damage. There consequently exists a need for an improved manner of identifying devices located on a network.

SUMMARY OF THE INVENTION

The present invention provides an improved apparatus, program product and method for identifying and validating network devices. In one aspect of the invention, an embodiment is directed to a distributed network device inventory system configured to classify and/or identify devices attached to one or more networks.

To this end, an embodiment may include a centralized, global master that stores identifying data associated with a network device. The global master may be in communication with multiple local masters distributed throughout a network. In one aspect, the local masters may coordinate discovery and identification processes for specific network domains. For instance, each local master may provide identifying data to the global master that is relevant to that local master's domain, while retaining a copy of that identifying data in a local data store.

Within each local master domain of one embodiment, one or more discovery managers may be resident and under the control of the local master. Each discovery manager may function as a resource manager for the local master, and may respond to requests from the local master to perform various collection and/or analysis processes. Each discovery manager may be remote from the local master, e.g., where a particular part of the enterprise network is private and inaccessible by the local master, such that the collection/analysis processes may be conducted remotely from the local data store for the domain.

In one embodiment, each discovery manager may access several different programmatic engines to perform various functions. Such functions may include determining identifying data associated with a network device. For instance, a range of Internet Protocol (IP) addresses of a network may be scanned. Such a scan may reveal identifying data regarding specific services provided at different IP addresses. Such identifying data may be correlated to stored identifying data to determine the identity of a device. For example, a network device may be categorized as being either known or unknown. Action may be taken with regard to an unknown network device. For instance, the device may be disabled, or a global data store of identifying data may be updated to account for the device.

Benefits realized by embodiments include the generation of a complete inventory of devices, so that other tools may maintain and validate current antiviral software, for instance. Additionally, unknown or problematic devices may be identified and addressed appropriately to improve system integrity. New devices or changes to existing devices may be quickly updated, and all the above advantages may be accomplished automatically and transparently with minimal processing and memory requirements. Embodiments have particular application in the context of large and complex networks, for the purpose of dynamically and transparently discovering, inventorying and/or validating devices that may be attached to those networks. Desirable attributes may include scalability, unobtrusiveness and transparency.

These and other advantages and features, which characterize the invention, are set forth in the claims annexed hereto and forming a further part hereof. However, for a better understanding of the invention, and of the advantages and objectives attained through its use, reference should be made to the Drawings, and to the accompanying descriptive matter, in which there is described exemplary embodiments of the invention.

BRIEF DESCRIPTION OF THE DRAWINGS

FIG. 5 is a flowchart having process steps executable by the discovery engine of in FIG. 1 to determine device identifiers and additional identifying data for delivery to the local master.

FIG. 6 is a flowchart having process steps executable by the discovery engine of in FIG. 1 for identifying local networks used to uniquely identify devices.

DETAILED DESCRIPTION

An embodiment consistent with the invention identifies and validates network devices by actively crawling through networks to collect identifying data. The identifying data comprises information indicative of a particular device or network, e.g., "hints" comprising the type of port, traffic, protocol and/or operating system used by a device. Other identifying data may include a serial number or previously assigned identifier associated with the device. The embodiment correlates the determined identifying data to stored device information. In this manner, the identifying data may be matched in order to categorize a device as being either known or unknown. Unknown devices may then be evaluated to determine if they should be approved and cataloged, or disabled from the network.

Figure 1:
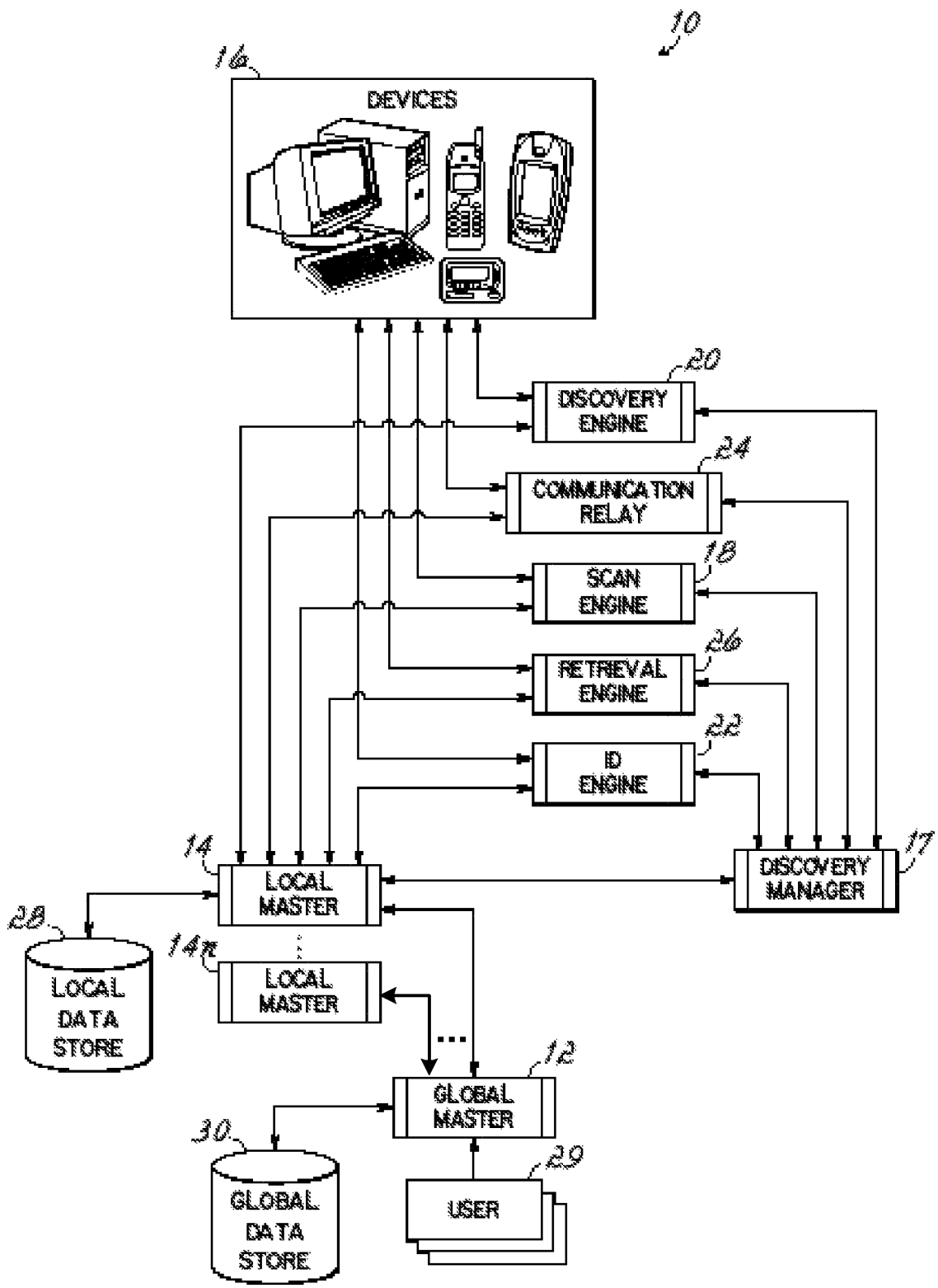
FIG. 1 is a block diagram of a distributed computer system having software consistent with the invention.

To accomplish this network device validation, the embodiment shown in FIG. 1 relies on a distributed network inventory system 10 configured to identify, classify and/or validate network devices 16. The system 10, or apparatus, may have particular application in the context of large and complex networks for the purpose of dynamically and transparently discovering, inventorying, validating, and/or disabling devices 16 attached to those networks.

The system 10 generally includes at least one centralized global master 12 that may ultimately store known device identifying data, i.e., inventory data. The global master 12 may further provide Application Program Interfaces (API's) to enable external users 29 to extract specific results. For instance, user 29 may generate a listing of inventoried devices running particular software to facilitate the distribution of updates, e.g., virus definition files.

Multiple local masters 14, 14n in communication with the global master 12 may be distributed throughout the system 10 to coordinate discovery and identification processes for specific portions, or network domains. Devices within a domain typically comprise network devices that are administered as a unit with common rules and procedures, e.g., devices sharing a common part of an Internet Protocol (IP) address.

Each local master 14 may provide to the global master 12 identifying data that is relevant to that local master's domain. The local master 14 will typically retain a copy of that identifying data within a local data store 28. Each local master 14, 14n coordinates discovery and analysis processes within its domain, and forwards the collected or analyzed identifying data to the global master 12.

One or more discovery managers 17 typically reside within the domain and under the control of the local master 14. Each discovery manager 17 may function as a resource manager for the local master 14. The discovery manager 17 may further respond to requests from the local master 14 to perform various collection or analysis processes. Each discovery manager 17 may be remote from the local master 14, e.g., where a particular part of the network is private and inaccessible by the local master 14. In such instances, the local master may use a communication relay 24 to remotely conduct collection/analysis processes.

Each discovery manager 17 may access several, different programmatic engines. As shown in FIG. 1, a scan engine 18 may identify networks and associated identifying data. For instance, the scan engine 18 may look for network infrastructures, e.g., routers, switches, etc., to determine a network topology. This information may be returned to the local master 14 in the form of hints, or network related identifying data. The scan engine 18 may additionally associate some identifying data with specific devices 16.

A discovery engine 20 may be initiated to scan a range of Internet Protocol (IP) addresses, and more specifically, several known ports at each IP address. In this manner, the discovery engine 20 may identify specific services provided at different IP addresses. The discovery engine 20 may use protocols expected for a number of ports to determine device identifiers and other identifying data. The identifying data may be sent to the local master 14.

A retrieval engine 26 may be used by the system 10 to determine identifiable attributes about device hardware and/or software. For instance, the retrieval engine 26 may determine serial numbers for a disk drive. The same or another retrieval engine 26 may attempt to detect a proprietary agent running on specific network devices to validate and identify those specific devices.

An ID engine 22 typically uses identifying data received from the local master 14 and its own determinations to classify remaining devices 16 as being known or unknown. The determinations of the ID engine 22 may be reported back to the local master 14.

As such, a network device 16 may be detected and cataloged as being either a known or unknown device. Benefits realized by the inventorying process include the generation of a complete inventory of devices running a particular operating system, e.g., Microsoft Windows®, so that other tools may maintain and validate current antiviral software. Additionally, unknown or problematic devices may be identified and addressed appropriately to improve system integrity. New devices or changes to existing devices may be quickly updated, and all the above advantages may be accomplished automatically and transparently with minimal processing and memory requirements.

Turning more specifically to each of the components of the system 10 shown in FIG. 1, the global master 12 may function largely as a warehouse for information gathered by any number of the local masters 14, 14n. The global master 12 is typically implemented on a server. In addition to collecting the identifying data from all of the local masters 14, 14n, the global master 12 may provide API's for use by external users 29 to extract specific results. To this end, the global master 12 may maintain a master inventory list within the global data store 30.

The local master 14 may be responsible for coordinating the discovery and identification processes for an assigned portion of the system's network. To this end, the local master 14 may retain a data store 28 of identifying data for its assigned network domain. On a periodic or otherwise automatic basis, the local master 14 may initiate various discovery and analysis engines. The local master 14 generally coordinates the return of identifying data gleaned by these engines to the local data store 28. The local master 14 is typically responsible for communicating updates from this data store 28 to the global master 12. The local master 14 may accept requests from the global master 12 to make changes to the local data store 28.

Local masters 14, 14n may each rely on programmatic engines to collect identifying data and validate devices 16. Examples of devices 16 include: servers, work stations, network hardware, time clocks, printers, RFAF's, PDA's, IP telephones, PLS terminal, UPS, environmental monitor, theft deterrent, music streaming, telephone switch and storage entities.

Each local master 14 may control multiple discovery managers 17. The discovery managers 17 for each local master 14 may be distributed across many networks. This distributed feature helps, in part, to ensure full network visibility without requiring additional local masters 14 and associated local data stores 28.

The discovery manager 17 generally functions as a resource manager for the parent local master 14. The discovery manager 17 may accept requests from the local master 14 to execute the appropriate discovery and identification processes. The discovery manager 17 may then execute those processes with any appropriate parameters. The discovery manager 17 may report the successful startup of the process to the local master 14, in addition to any execution failures.

As shown in the embodiment of FIG. 1, there are at least five discovery and identification processes that the discovery manager 17 may start on behalf of local master 14. These processes include the scan engine 18, the discovery engine 20, the ID engine 22, the communication relay 24 and the retrieval engine 26.

The discovery engine 20 typically scans a range of Internet Protocol (IP) addresses and collects basic information on any IP address that responds to the scan. The identifying data may be determined by attempting to contact certain internally-specified services, as well as well known Transmission Control Protocol (TCP) and User Datagram Protocol (UDP) services. Where desired for transparent processing considerations, only methods compliant with the design specification for the service may be used in collecting this information. For instance, it may be expected that any approved device will comply with the appropriate Request for Comments (RFC) for well-known services, or some other internal service specification.

Discovery engine 20 processes may be triggered by the discovery manager 17 on behalf of the local master 14. For example, the local master 14 may control one discovery manager 17 for each network in its local data store, and each discovery manager 17 may pass a requested range of IP addresses to the discovery engine 20. For each IP address in the range, the discovery engine 20 may generate a communication and listen for a response. If a reply is received for the IP address, further discovery may be attempted. The IP address may otherwise be skipped.

If a reply is received by the discovery engine 20, the discovery engine 20 may be able to determine identifying data using a known or proprietary protocol. To this end, the discovery engine 20 may use the retrieval engine 26 or communication relay 24 to retrieve identifying data, e.g., a device identifier. Exemplary protocols used in connection with an address may include: HTTP(TCP/80), Telnet (TCP/23), SNMP (UDP/161) and FTP (TCP/21). Identifying data gathered from these services may be passed back to the local master 14, along with other identifying data regarding network connectivity from the discovery engine 20 to the target device 16. In one embodiment, the identifying data passed to local master 14 may not (without further determination) definitively identify the type of device, or whether the IP address is a unique device or simply another network interface on an existing device 16.

The scan engine 18 may perform a discovery function similar to the discovery engine 20, in addition to various device identification functions. The scan engine 18 may primarily identify network equipment, e.g., switches and routers. The scan engine 18 may make use of Simple Network Management Protocol (SNMP) queries to discover additional networks that should potentially be under the control of the local master 14. SNMP is a protocol comprising a set of rules that generally allows a computer to get identifying data from another computer across the Internet. For example, routers can keep track of the number of bytes, packets, and errors that were transmitted and received on each interface (port). The identifying data is maintained within SNMP by a Management Information Base (MIB), which may be accessed to retrieve the data.

In one embodiment, the scan engine 18 may also reconcile some identifying data into devices, and may pass its identification detail back to local master 14. The scan engine 18 may also report all IP addresses and all non-IP devices seen by the network equipment back to the local master 14 as hints, or identifying data. The scan engine 18 thus may provide an indication as to where a device is actually attached on a network.

The ID engine 22 may consume the identifying data from the local master 14 in order to categorize the devices 16 associated with the identifying data as being either known or unknown. That is, the ID engine 22 may request a list of hints and known device identifiers from the local master 14 to perform various analysis functions, including correlating the identifying data. The results of the correlation may be passed back to local master 14 as device categorizations. If a conclusion regarding particular identifying data cannot be reached, then that data may be forwarded to the local master 14 as an update for use in making a device determination at a subsequent time.

The retrieval engine 26 may be configured to retrieve hardware and/or software attributes from a device. As such, the retrieval engine 26 may interface with a device agent, e.g., a daemon that outputs identifying data. The identifying data may include, for instance, serial numbers for a disk drive, a Media Access Control (MAC) address, a Domain Name System (DNS) name, operating system information, and data retrievable from a Windows® registry. A MAC address is an identifier attached to most forms of networking equipment. The MAC address allows each host to be identified and allows communications to be marked for specific hosts. DNS is an Internet service that translates domain names into IP addresses. A Windows® registry is a database used to store settings and options for versions of Microsoft Windows®. The registry may contain information and settings for the hardware, software, users, and preferences of the PC. Whenever a user makes changes to a control panel setting, file association, system policy, or installed software, the changes are reflected and stored in the registry.

An exemplary retrieval engine 26 may include processes configured to interface with the registry or other agent, e.g., inetd. Where advantageous, the agent may comprise a proprietary process that outputs identifying data comprising a unique identifier associated with the device, or a device identifier. The proprietary agent may output an alphanumeric ID comprising the device identifier in an Extensible Markup Language (XML) document, for instance. XML documents comprise data objects stored on computers that partially describe the behavior of programs.

The communication relay 24 may provide additional network connectivity for the system 10. The communication relay 24 may function as a proxy agent for the local master 14 when a network is not visible to local master 14. As such, the identifying data determined by the communication relay 24 may be similar to that determined by the retrieval engine 26, only the identifying data may not have been directly visible to the local master 14. The communication relay 24 may have particular application in the context of a proprietary device agent. For instance, when the local master 14 needs to forward a command request to a proprietary device agent that is out of direct communication with the local master 14, this request may be routed to a discovery manager 17 known to have network connectivity to the device agent. The discovery manager 17 may, in turn, forward this request to the communication relay 24. The communication relay 24 may communicate the request to a device agent to collect the device identifier. The communication relay 24 may then forward the device identifier directly back to local master 14 in much the same way as the retrieval engine 26.

The global master 12, local master 14 and any of the above described processes 18, 20, 22, 24 and 26 may run separately or together on one or more apparatuses, e.g., computers. For the purposes of this invention, an exemplary computer and device 16 may represent practically any type of computer, computer system or other programmable electronic device capable of functioning within a networked environment.

A typical computer configured to run one or more of the above processes 12, 14, 16, 17, 18, 20, 22, 24, 26, 28 and 30 typically includes at least one central processing unit in communication with a memory, which may represent the random access memory (RAM) devices comprising the main storage of computer, as well as any supplemental levels of memory, e.g., cache memories, non-volatile or backup memories (e.g., programmable or flash memories), read-only memories, etc. In addition, memory may be considered to include memory storage physically located elsewhere in computer, e.g., any cache memory in a processor or a smart card, as well as any storage capacity used as a virtual memory, e.g., as stored on a mass storage device or on another computer coupled to computer. For additional storage, a computer may also include one or more mass storage devices, e.g., a floppy or other removable disk drive, a hard disk drive, a direct access storage device (DASD), an optical drive (e.g., a CD drive, a DVD drive, etc.), smart card and/or a tape drive, among others. An exemplary mass storage may include a register or database. Of note, one of skill in the art will recognize that the inclusion and distribution of the databases (data stores), files and other stored data may be altered substantially while still conforming with the principles of the present invention.

Furthermore, the computer may include an interface with one or more networks (e.g., a LAN, a WAN, a wireless network, and/or the Internet, among others) to permit the communication of information with other computers and electronic devices. It should be appreciated that computer typically includes suitable analog and/or digital interfaces as are well known in the art. Computers are generally interfaced with one another via a network, which may be public and/or private, wired and/or wireless, local and/or wide-area, etc. Moreover, the network may represent multiple, interconnected networks. For example, the network may include the Internet.

The computer typically operates under the control of an operating system and executes or otherwise relies upon various computer software applications, components, programs, objects, modules, data structures, etc. Moreover, various applications, components, programs, objects, modules, etc. may also execute on one or more processors in another computer coupled to computer via a network.

In general, the routines executed to implement the embodiments of the invention, whether implemented as part of an operating system or a specific application, component, program, engine, process, programmatic tool, object, module or sequence of instructions, or even a subset thereof, may be referred to herein as "computer program code", or simply "program code". Program code typically comprises one or more instructions that are resident at various times in various memory and storage devices in a computer, and that, when read and executed by one or more processors in a computer, cause that computer to perform the steps necessary to execute steps or elements embodying the various aspects of the invention. One of skill in the art should appreciate that embodiments consistent with the principles of the present invention may nonetheless use program code resident at only one, or any number of locations.

Moreover, while the invention has and hereinafter will be described in the context of fully functioning computers and computer systems, those skilled in the art will appreciate that the various embodiments of the invention are capable of being distributed as a program product in a variety of forms, and that the invention applies equally regardless of the particular type of computer readable, signal bearing media used to actually carry out the distribution. Examples of signal bearing, computer readable media include but are not limited to tangible, recordable type media such as volatile and non-volatile memory devices, floppy and other removable disks, hard disk drives, magnetic tape, optical disks (e.g., CD-ROM's, DVD's, etc.), among others, and transmission type media such as digital and analog communication links.

In addition, various program code described hereinafter may be identified based upon the application or engine within which it is implemented in a specific embodiment of the invention. However, it should be appreciated that any particular program nomenclature that follows is used merely for convenience, and thus the invention should not be limited to use solely in any specific application or engine identified and/or implied by such nomenclature. Furthermore, given the typically endless number of manners in which computer programs may be organized into routines, procedures, methods, modules, objects, and the like, as well as the various manners in which program functionality may be allocated among various software layers that are resident within a typical computer (e.g., operating systems, libraries, API's, applications, applets, etc.), it should be appreciated that the invention is not limited to the specific organization and allocation of program functionality described herein.

The various software components and resources illustrated in FIG. 1 may be implemented in a number of manners, including using various computer software applications, routines, components, programs, objects, modules, data structures and programs. Those skilled in the art will further recognize that the exemplary environments illustrated in FIG. 1 are not intended to limit the present invention. Indeed, those skilled in the art will recognize that other alternative hardware and/or software environments may be used without departing from the scope of the invention.

Figure 2:
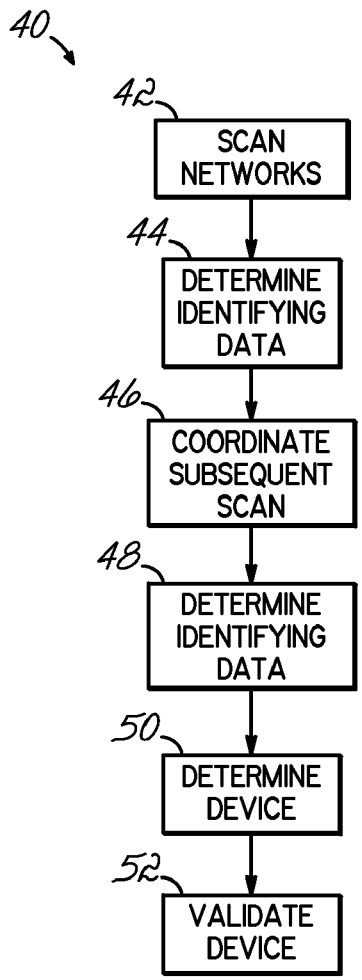
FIG. 2 is a flowchart having process steps executable by the system of FIG. 1 for identifying and validating network devices.

The flowchart 40 of FIG. 2 illustrates exemplary methods steps that are consistent with the principles of the present invention. The method steps of the flowchart 40 are executable by the system 10 of FIG. 1 for generally identifying and validating network devices 16. At block 42 of FIG. 2, the system 10 may determine networks to be scanned. For instance, the scan engine 18 may determine local networks directly attached to a local server. The scan engine 18 of the system 10 may determine at block 44 identifying data comprising IP addresses and protocol information.

At block 46 of FIG. 2, the identifying data may be reported from the scan engine 18 of the system 10 to the local master 14. The identifying data may be used for, among other purposes, coordinating subsequent scans and discovery processes. Based on the identifying data at block 42, for example, the local master 14 may seek and receive approval from the global master 12 to scan additional information from the network(s). This coordination at block 46 may avoid duplication of scanning of the same networks by different local masters 14n. That is, the global master 12 may associate a particular network with a particular local master 14 to avoid redundant network assignments.

The system 10 may determine at block 48 additional identifying data. For example, the local master 14 may prompt the discovery engine 20 to scan approved networks/IP ranges to in order to generate additional identifying data. The ID engine 22 may then use the identifying data to determine at block 50 router and device identification. The system 10 may then compare determined devices 16 with a stored list to validate at block 52 that discovered devices 16 should actually be on the network, and/or that another device 16 is missing. While the flowchart 40 outlines one embodiment's general approach to inventorying a network, one skilled in the art will appreciate that the sequence and interaction of the particular programmatic engines 12, 14, 16, 17, 18, 20, 24 and 26 may vary per application specifications.

Figure 3:
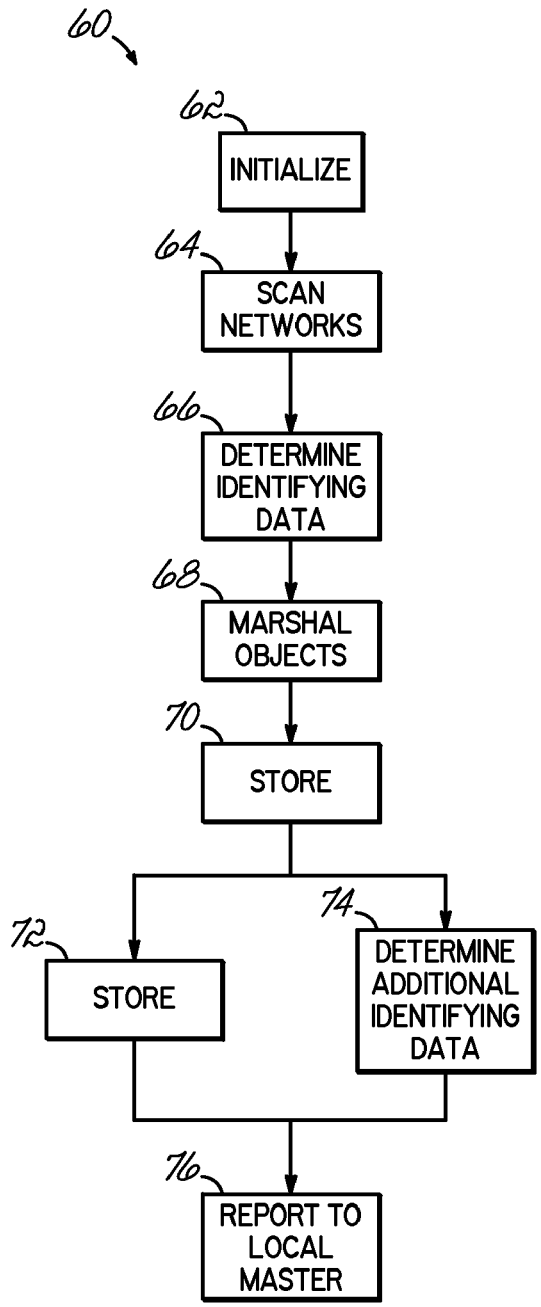
FIG. 3 is a flowchart having process steps executable by the scan engine of FIG. 1.

FIG. 3 is a flowchart 60 showing in greater detail process steps executable by the scan engine 18 shown in FIG. 1. As such, the steps of the flowchart 60 may have application within blocks 42 and 44 of the embodiment shown in FIG. 2. The scan engine 18 generally identifies networks and associated identifying data. For instance, the scan engine 18 may look for network infrastructures, e.g., routers, switches, etc., to determine a network topology that may be returned to the local master 14 as identifying data. The scan engine 18 may additionally associate some identifying data with specific devices 16.

At block 62 of FIG. 3, the scan engine 18 may receive a command to initiate a network scan. The scan engine 18 may proceed at block 64 to crawl through one or more local networks. The scan engine 18 typically determines some initial identifying data at block 66. For instance, the scan engine 18 may determine data relating to operating systems, interconnections, data flow, and/or proprietary identifiers, i.e., agent tags. Where applicable, such identifying data may include information gleaned from SNMP.

The scan engine 18 may marshal objects at block 68 from the identifying data. For example, the scan engine 18 may parse information from an XML document to build a collection of objects that model a device in object hierarchy. An object may comprise a self-contained entity that includes both data and procedures to manipulate the data. In the context of FIG. 3, exemplary objects may include an interface object, a port object and an IP address object. The scan engine 18 may store at block 70 the objects describing the device and their relationship to one another.

The scan engine 18 may then serialize at block 72 the object and relationship information. For instance, the scan engine 18 may generate an XML document for delivery at block 76 to the local master 14. The scan engine 18 may also determine and deliver at block 74 any additional identifying data, including any bridge and switching information that may later be helpful in identifying a network or device 16.

Figure 4:
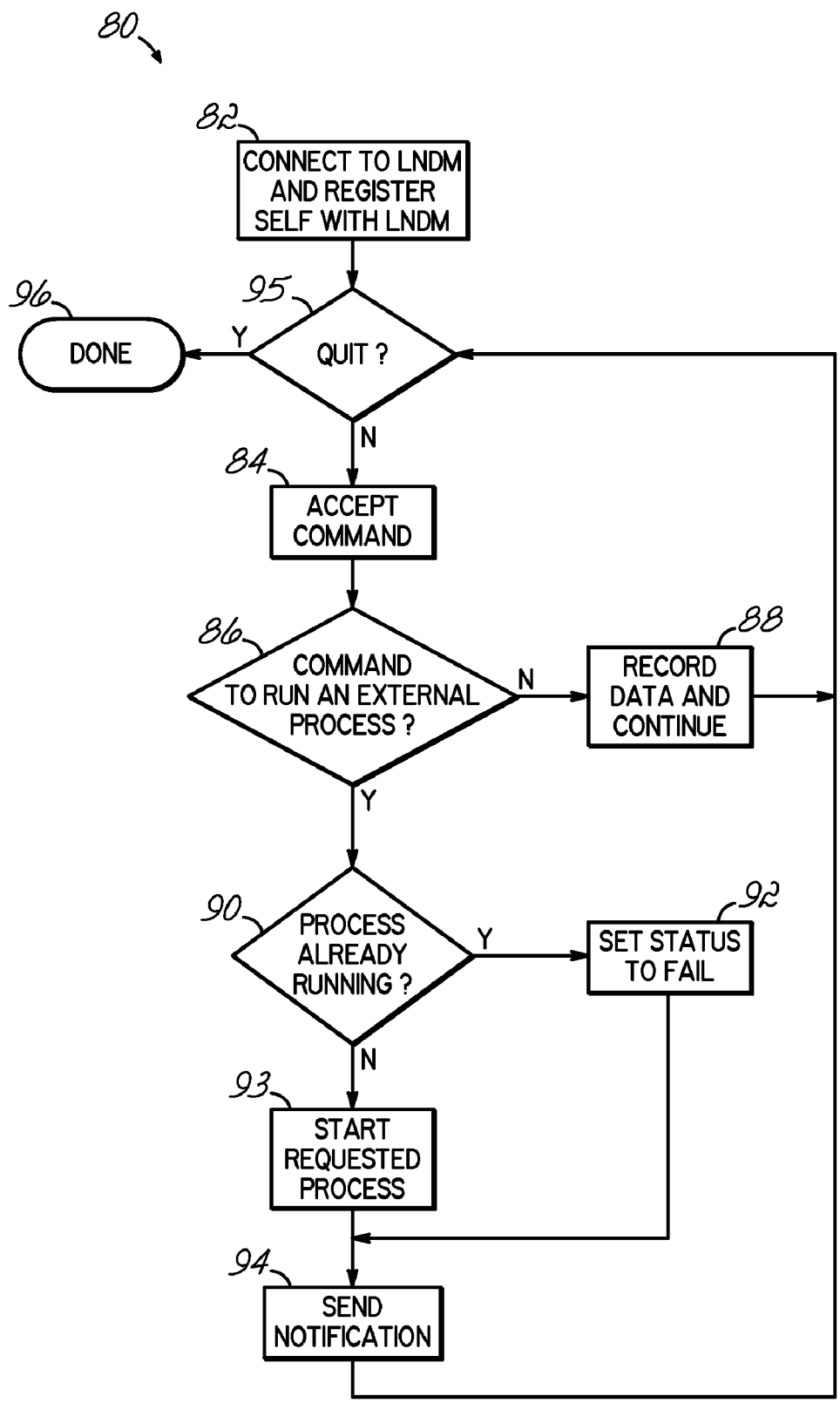
FIG. 4 is a flowchart having process steps executable by the discovery manager of FIG. 1.

FIG. 4 shows process steps executable by the discovery manager 17 of FIG. 1. The flowchart 80 more particularly shows an embodiment in which the discovery manager 17 facilitates resource management for its parent, local master 14. That is, the discovery manager 17 generally accepts requests from the local master 14 to execute the appropriate discovery and identification processes. The discovery manager 17 may then execute those processes with any appropriate parameters.

Turning more particularly to block 82 of FIG. 4, the discovery manager 17 may connect to the local master 14. For instance, a typical protocol may involve the discovery manager 17 signaling that it is online and awaiting instructions from the local master 14. In this manner, the discovery manager 17 lets the local master 14 know that it is connected. The local master 14 may respond back with a discovery engine ID number. The discovery manager 17 may use the discovery engine ID number for all future communications to the local manager 14.

The discovery manager 17 may accept a command at block 84 of FIG. 3. The command may include instructions from the local master 14 to pass information onto a programmatic engine, e.g., pass a requested range of IP addresses to the discovery engine 20. The command typically comprises an XML formatted document.

The discovery manager 17 may determine at block 86 if the command accepted at block 84 is to run an external process, e.g., a programmatic engine 18, 20, 22, 26. If not, then the discovery manager 17 at block 88 may record the data and continue internal processes, e.g., debugging or otherwise managing internal processes. For instance, the discovery manager may record the discovery engine ID number at block 88.

If the command at block 86 is alternatively configured to initiate an external process, then the command will typically include any parameters, e.g., IP addresses, for that external process. As such, the discovery manager 17 may extract from the command the parameters and track designated external processes. Based on those parameters, the discovery manager 17 may determine at block 90 whether the designated external process is already running. That is, the discovery manager 17 may check to see if an entity is already running a copy of an applicable program with those parameters. If so at block 92, the discovery manager 17 may fail the command and report back to the local master 14 that the process is already running. That communication to the local master 14 may include diagnostic statistics about when the process was started, among other information. In this manner, the discovery manager 17 may help avoid wasted processing power and time otherwise attributable to unnecessary, duplicative program execution. Absent such features, a subsequent process could sit idle and consume resources while a previous process runs longer than anticipated.

Where the process has not begun running at block 90, then the discovery manager 17 may initiate activation of the process at block 93. In any case, the discovery manager 17 may send notification of the program status at block 94.

Should the discovery manager 17 detect at block 95 a shutdown flag in a command, or that the local master 14, itself, has gone away, or if other certain error conditions are detected, then the discovery manager 17 may set a flag that indicates that it is time to quit at block 96.

FIG. 5 is a flowchart 100 having steps executable by the discovery engine 20 of FIG. 1. In the context of FIG. 2, the discovery engine 20 may comprise an external process initiated by the discovery manager 17. As such, the processes of the flowchart 100 may begin in response to a request from the discovery manager 17, e.g., the discovery engine 20 is not typically a standing process. The discovery engine 20 generally scans IP addresses and known ports to identify specific services provided at different IP addresses. To this end, the discovery engine 20 may use protocols expected for a number of ports to determine device identifiers and additional identifying data for delivery to the local master 14.

The processes of the flowchart 100 generally scan a range of Internet protocols/protocol addresses to collect identifying data regarding any address that responds to a scan. At block 102 of FIG. 4, the discovery engine 20 may receive from the discovery manager 17 parameters that include an IP address range to scan. In addition to an address range, other parameters may include timing parameters on how long to wait for a response under different conditions, as well as any known SNMP and MIB information associated with the addresses. The discovery engine 20 may read those IP addresses and access any known protocol information to determine applicable communication protocols for those addresses. In this manner, the discovery engine 20 may effectively perform a setup step of acquiring applicable rules of operation.

The discovery engine 20 at block 104 may run through the entire IP range to determine which addresses are responsive. The discovery engine 20 may determine if a particular address is alive, or responsive, by sending an ICMP echo request, e.g., a ping.

The discovery engine 20 may use the ping requests to collect identifying data at block 106. For example, the discovery engine 20 may utilize the retrieval engine 26. An exemplary retrieval engine 26 may use program code configured to interface with an interface registry or other agent of a device 16. Where advantageous, the agent may comprise a proprietary process that outputs identifying data comprising a unique identifier associated with the device, or a device identifier. The proprietary agent may output an alphanumeric ID comprising the device identifier in an XML document, for instance. As such, the discovery engine 20 may generate and send an XML command and listen for an XML reply. If the service is rejected, or if it connects, but fails to respond within an appropriate time or in an appropriate format, then the discovery engine 20 may treat the response as if the device identifier is unavailable on the device.

If a device identifier is alternatively on a device, and a response is consequently received at block 108 over the TCP service connection, then the discovery engine 20 may bypass all other types of collection. Alternatively, if no response is received by the discovery engine at block 108, then the discovery engine 20 may accomplish other kinds of collection. Such collections may include trying to identify to which types of service an unresponsive device will respond.

At blocks 110 and 111, the discovery engine 20 may sequence through and process the list of alive IP addresses determined at block 104. The discovery engine 20 typically sends at block 112 the results of the collected identifying data to the local master 14.

FIG. 6 is a flowchart 113 showing steps that may be taken by the discovery engine 20 to assist in uniquely identifying devices. The steps of the flowchart 113 show processes for identifying local networks used to identify devices. At block 114, the discovery engine 20 may receive from the discovery manager 17 parameters that may include an IP address range to scan. The discovery engine 20 may identify local networks at block 115. For instance, the discovery engine 20 may use "ifconfig" or another conventional interface program to determine the status and other identifying data of active network interfaces.

At block 116, the discovery engine 20 may determine network-related identifying data, such as the identity of a first router hop. For example, the discovery engine 20 may use "netstat", "traceroute", or another known program to determine how many hops a communication takes and/or how long each hop takes, among other identifying data. For example, netstat is a command line tool that displays a list of the active network connections a computer currently has, both incoming and outgoing. In this manner, the discovery engine 20 may determine what networks are locally visible to a given discovery manager 17.

If the local master 14 was specified in the parameters at block 117, then the discovery engine 20 may at block 118 send a request to the local master 14 updating network related identifying data to be associated with the local master 14. In any case, the discovery engine 20 may send at block 119 the identifying data to the local master 14 for subsequent processing towards identifying networks and devices.

Figure 7:
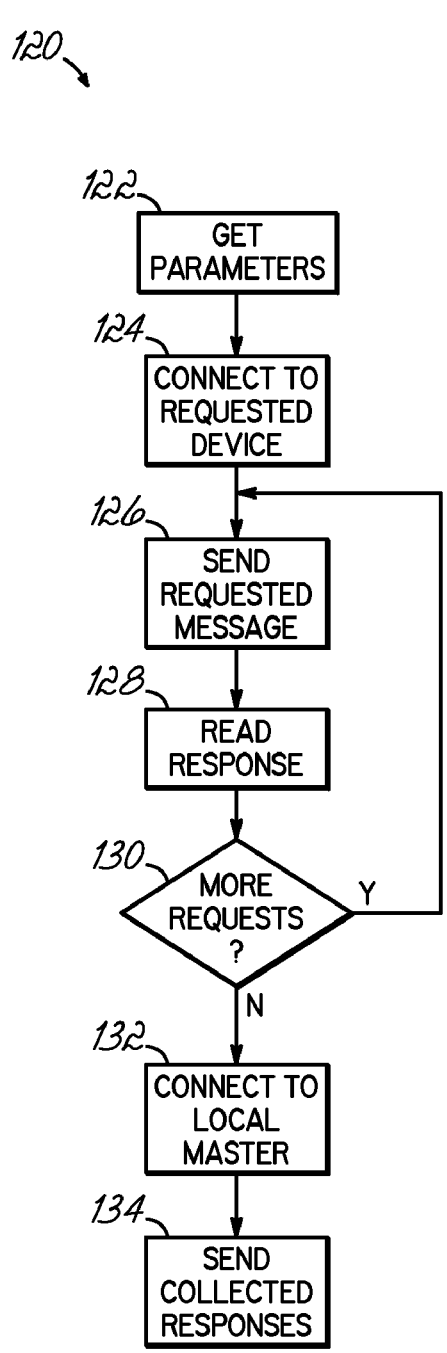
FIG. 7 is a flowchart having process steps executable by the communication relay of FIG. 1.

FIG. 7 is a flowchart 120 having processes executable by the communication relay 24 of FIG. 1. In certain implementations, the local master 14 may be running on a different system than a device 16 to be inventoried. The communication relay 24 may be positioned on a local network that can see the device 16, while remaining in communication with the local master 14, i.e., via the discovery manager 17. As such, a local master 14 that needs to query to a particular device 16 can send the query to a discovery manager 17. The discovery manager 17, in turn, by virtue of running locally to wherever that device 16 can be seen, may format the query as a request to the communication relay 24. In this manner, the communication relay 24 may accomplish the actual communication to the device 16.

As shown at block 122 of FIG. 7, the communication relay 24 may get command line parameters from the discovery manager's query. For each request that has given those parameters, the communication relay engine 24 may connect at block 124 to the device 16, then send at block 126 the required query/message as originated by the local master 14.

The communication relay 24 may read at block 128 the response from the device 16, and typically stores the response internally. The communication relay 24 may accomplish these steps for multiple requests at block 130 of FIG. 6. The communication relay 24 may connect at block 132 to the local master 14 and send at block 134 all of the responses in batch to the local master 14.

Figure 8:
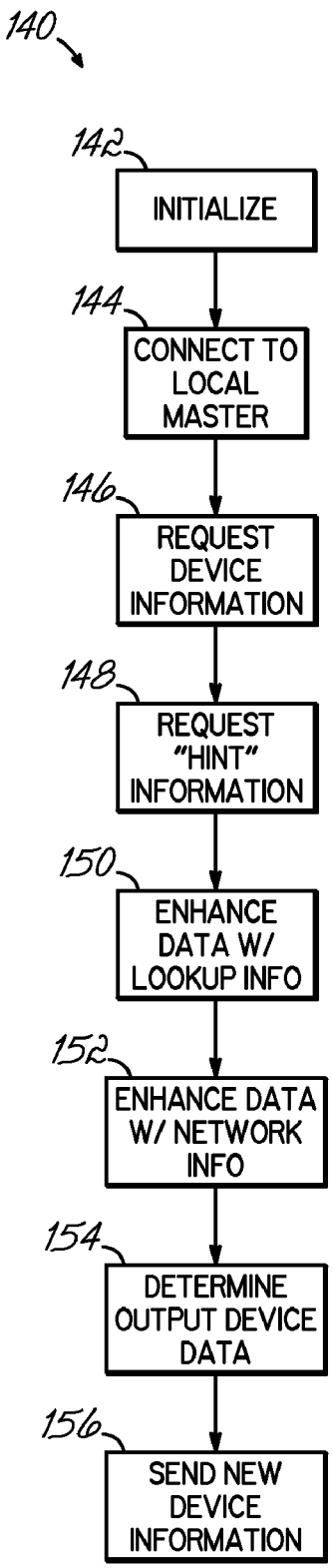
FIG. 8 is flowchart having process steps executable by the ID engine of FIG. 1 for classifying devices as being known or unknown.

FIG. 8 shows a flowchart 140 having steps executable by the ID engine 22 of FIG. 1. The process steps of the flowchart 140 more particularly show a method of using identifying data received from the local master 14 and other sources to classify devices 16 as being known or unknown. The ID engine 22 takes in identifying data generated from other engines, including an unknown IP address, and categorizes it. That is, the ID engine 22 may match ID addresses to a specific device 16. The determinations of the ID engine 22 are typically reported back to the local master 14.

Turning more particularly to FIG. 8, the ID engine 22 initializes at block 142. Initialization processes at block 142 may include reading a command from the local master 14 and parsing any arguments in the command. The ID engine 22 may connect to the local master at block 144.

The ID engine 22 may request device, hint and other identifying data from the local master 14 at blocks 146 and 148, respectively. Device identifying data may include a device identifier or hardware information obtainable from SNMP, for instance. Hints typically comprise identifying data concerning an IP address, acknowledging that one device may have multiple IP addresses. Both the device and hint identifying data may be retrieved from the local master's data store 28. As discussed herein, such identifying data is typically acquired by the local master 14 through the processes of the scan engine 18 and/or the discovery engine 20.

The device and hint identifying data may be enhanced automatically at block 150 with additional identifying data received from lookup tables accessible to the ID engine 22. The lookup tables may be populated at the time of initialization at block 142. For example, a SNMP object ID determined by the ID engine 22 may be matched to stored identifying data comprising vendor information that is logically associated with that SNMP data. Other identifying data may include a MAC address or hardware address. Such an address might be useful in matching identifying data that regards the manufacturer of a device 16. The identifying data may include data obtained from the device 16 when the device is logged in.

As such, the ID engine 22 may proceed through a list of devices 16 to logically associate them with other identifying data, such as vendor information or an SNMP object ID. This associative process may be particularly useful in identifying devices 16 that are not a proprietor's. For instance, the ID engine 22 may match the device identifying data against an updated list of a proprietor's devices to determine any devices that do not belong on the system.

At block 152 of FIG. 8, the ID engine 22 may enhance the identifying data using network related identifying data. In this step, the ID engine 22 may attempt to discern more about an unknown device 16 by using outside network information. For example, the ID engine 22 may determine whether the device 16 responds or otherwise behaves like a Windows® device. Namely, the device 16 may respond on a specific port in a known, recognizable way. The ID engine 22 may additionally or alternatively determine at block 152 if the device 16 has an X Windows® or other type of identifiable server. As above, this identifying data may logically be associated with the other identifying data.

Identifying data gathered from the local master 14 and generated during the ID engine's processes may be written at block 154 to an external file. The ID engine 22 may then format the file, e.g., using XSL Transformations. The ID engine 22 may use a batch process and/or the configuration file to help logically associate, or match devices 16 to identifying data. Data indicative of the logical associations may then be sent at block 156 back to the local master 14 for storage and other processing.

Figure 9:
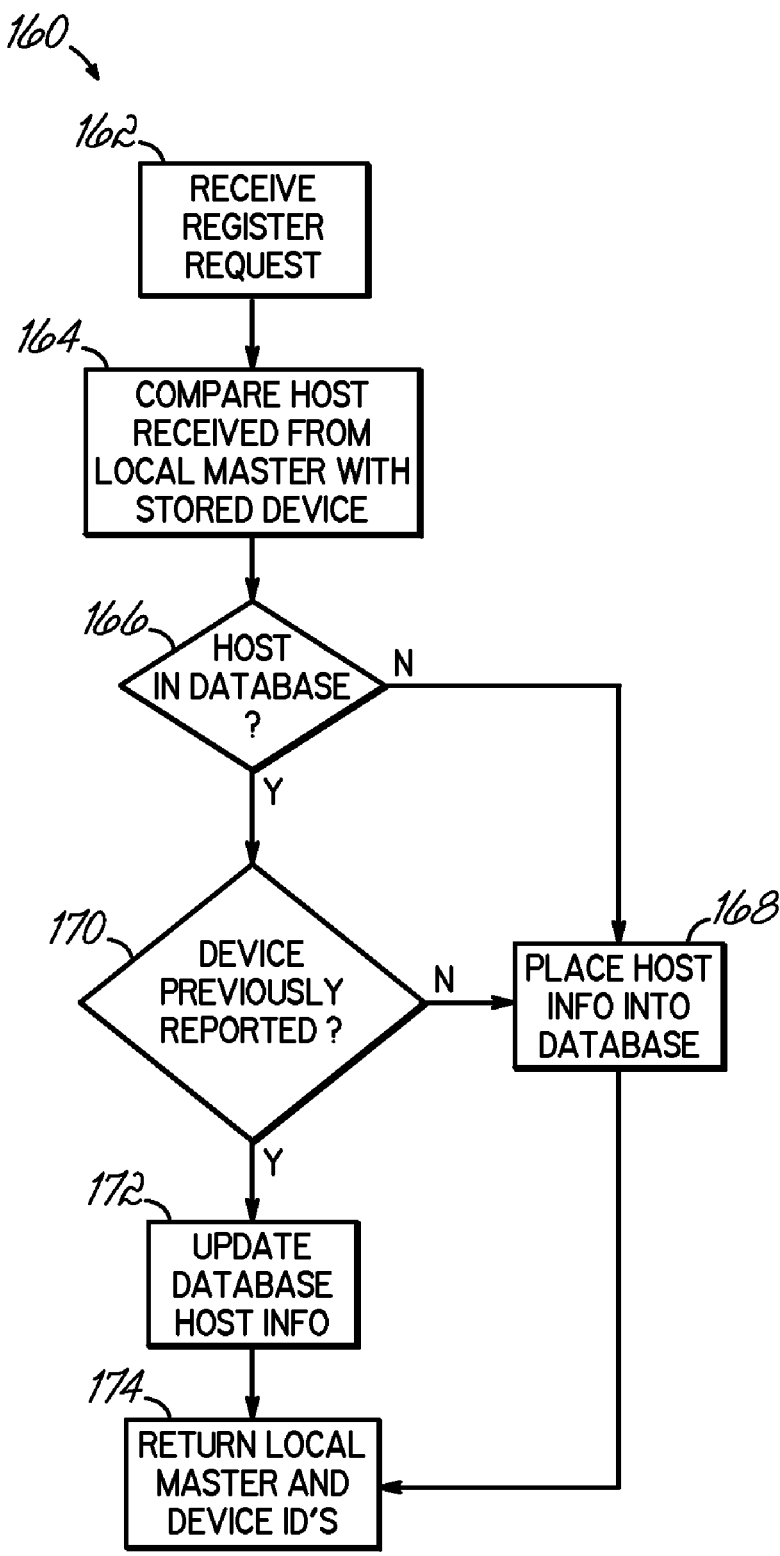
FIG. 9 is flowchart having process steps executable by the global master of FIG. 1 for registering a local master.

FIG. 9 shows a flowchart 160 having a sequence of steps executable by the global master 12 of FIG. 1 for adding identifying data particular to a local master 14 to a global data store 30, i.e., registering a local master 14. At block 162 of FIG. 9, the global master 12 may receive an add local master request. The received request may include information that includes identifying data particular to the local master 14. Such identifying data typically comprises hardware and/or software information that regards the host running the local master 14, e.g., a disk serial number, a MAC address, a processor ID, an operating system, etc.

At block 164, the global master 12 may compare the host identifying data with identifying data stored in the global data store 30. If the host identifying data is determined at block 166 to not be in the global data store 30, then that host data may be placed at block 168 into the global data store 30.

If the host identifying data alternatively matches at block 166 in the global data store 30, then the global master 12 may determine at block 170 if the host has been previously reported. This precaution at block 170 may avoid confusion stemming from redundancy, i.e., multiple host identifiers for the same local master 14. If the host has not been previously reported, then the new host identifying data may be placed at block 168 into the global data store 30. Otherwise, the redundant host data may be updated at block 172. An appropriate update may include storing the host data having the most recent timestamp. In any case, the global master 12 may return at block 174 the identifying data, i.e., the host identifier, to the local master 14 and the host. The local master 14 and host may store the identifying data so that on a subsequent reporting process, the identifying data may be initially presented to streamline identifications.

Figure 10:
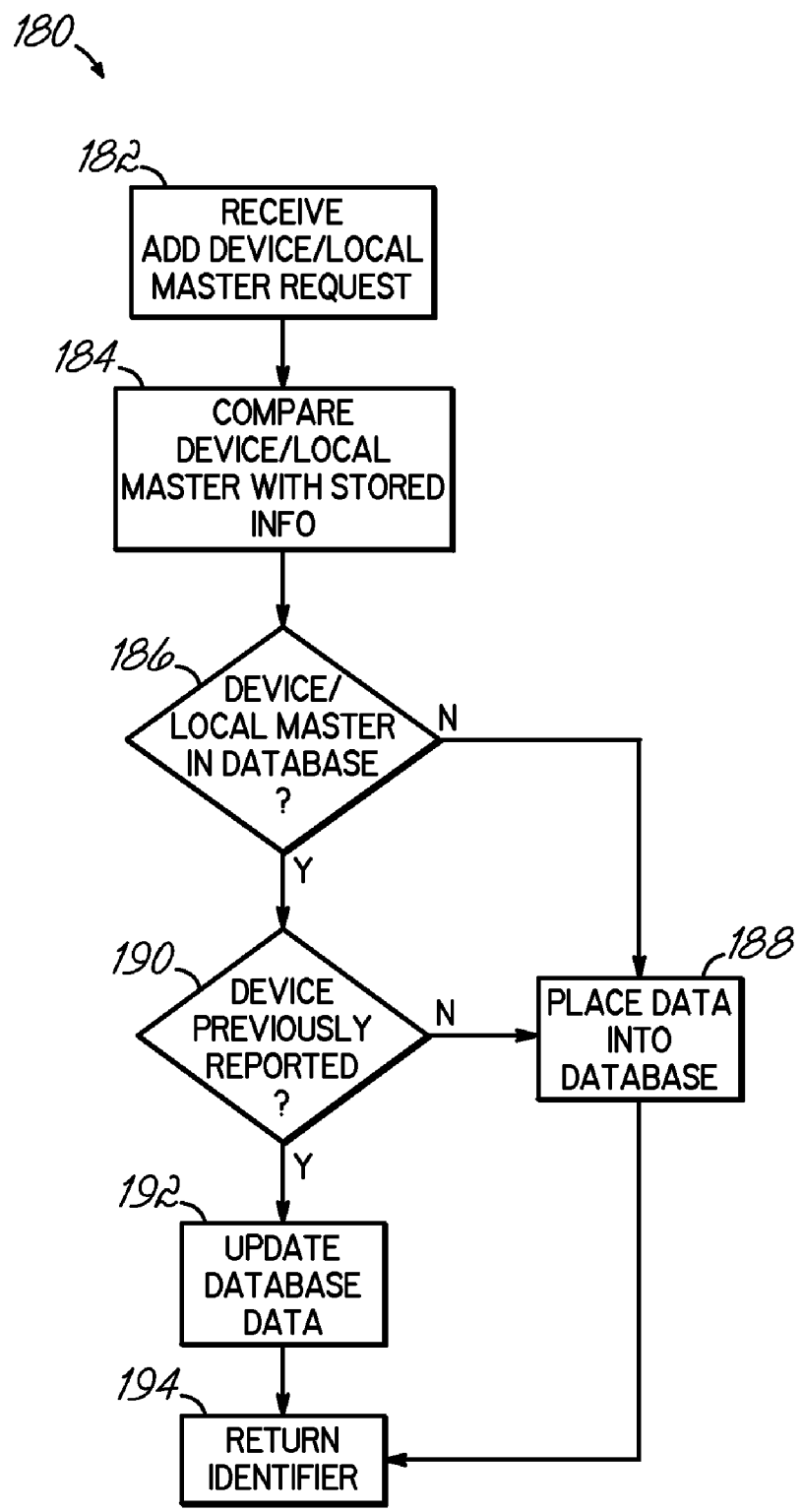
FIG. 10 is flowchart having process steps executable by the global master of FIG. 1 for recording identifying data particular to a device.

FIG. 10 shows a flowchart 180 having a sequence of steps executable by the global master 12 of FIG. 1 for adding identifying data particular to a device 16 to a global data store 30. At block 182 of FIG. 10, the global master 12 may receive an add device request. The received request may include information that identifies the device with other identifying data forwarded by the local master 14. The processes of the flowchart 180 may presuppose that the local master 14 has already been registered with the global master, as described in detail in FIG. 9. As such, the global master 12 may maintain a unique identifier associated with the local master 14. The unique identifying data may include both this identifier unique to the local master (program code), as well as a separate identifier unique to the host or computer executing the local master 14. This host and local master identifying data may be passed along with a device identifier to effectively identify and validate a device 16.

At block 184, the global master 12 may compare the local master identifying data and the device identifier with identifying data stored in the global data store 30. If matching identifying data is determined at block 186 not to be in the global data store 30, then that identifying data may be placed at block 188 into the global data store 30.

If the device and local master identifying data alternatively matches at block 186 in the global data store 30, then the global master 12 may determine at block 190 if the device has been previously reported. This precaution at block 190 may avoid confusion stemming from redundancy. If the device has not been previously reported, then the new device identifying data may be placed at block 188 into the global data store 30.

Otherwise, the redundant device identifying data may be updated at block 192. As above, an appropriate update may include storing a device identifier having the most recent timestamp. In any case, the global master 12 may return at block 194 the identifying data, i.e., the device identifier, to both the local master 14 and the device 16. In one example, the local master 14 may recognize that identifying data comprising a SNMP name gleaned by a first scan and identifying data generated on second scan both describe a common device. For instance, the system 10 may determine that a known device identifier is associated with the identifying data of the first and second scan. As such, the system 10 may associate all the identifying data with the appropriate device 16. The local master 14 and device 16 may store the identifying data such that on a subsequent reporting process, the updated identifying data, e.g., the device identifier, may be initially presented to streamline identifications.

Figure 11:
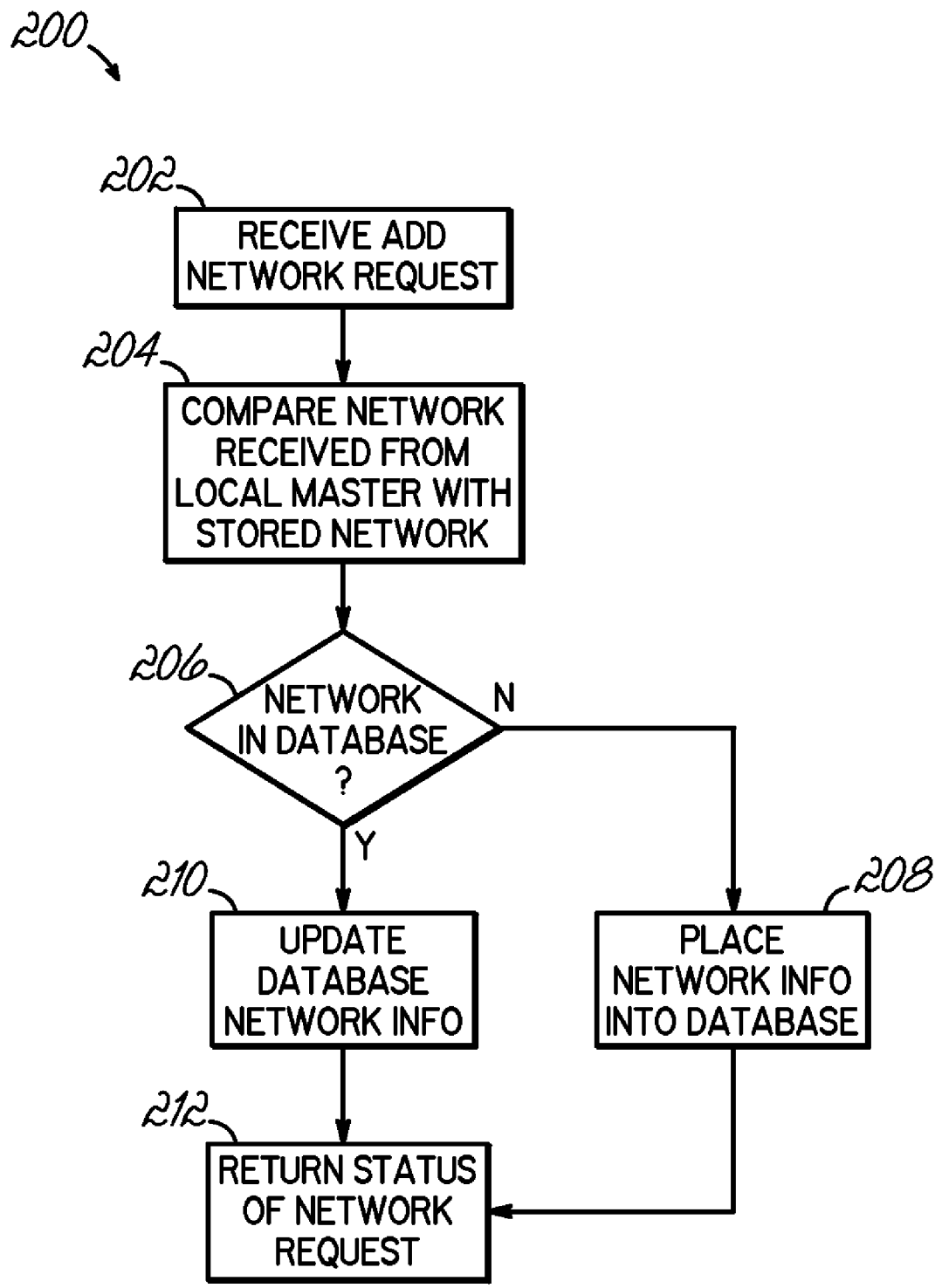
FIG. 11 is flowchart having process steps executable by the global master of FIG. 1 for recording identifying data particular to a network.

FIG. 11 shows a flowchart 200 having steps suited for execution by the global master 12 of FIG. 1 for adding to the global data store 30 identifying data indicative of a network. At block 202 of FIG. 11, the global master 12 may receive a request from a local master 14 to add a network. The global master 12 may compare at block 204 the network ID received from the local master 14 with a stored network ID. If the network is determined at block 206 to already be in the global data store 30, then the global master 12 may update the global data store 30 at block 210. For instance, the global master 12 may update the database records with the network ID information having the most recent timestamp.

If the global master 12 alternatively determines at block 206 that the network is not already registered in the global data store 30, then the global master 12 may place the network ID information into the global data store at block 208. In any case, the global master 12 may return to the local master 14 at block 212 the status of the network request. For instance, the global master 12 may inform the local master that the network is already being monitored by another local master 14n. The global master 12 may alternatively inform the local master 14 that the network ID has been updated or added to the global data store 30.

In practice, multiple engines may build upon and further develop the identifying data generated by other engines towards uniquely identifying a device. In one example, the scan engine 18 may determine identifying data relating to a local network of a particular device 16. For instance, the scan engine 18 of the system 10 may determine identifying data comprising IP addresses and protocol information indicative of the network and device. This identifying data may be reported from the scan engine 18 to the local master 14.

The identifying data may be used for, among other purposes, coordinating subsequent scans and discovery processes. Based on the identifying data, for example, the local master 14 may seek and receive approval from the global master 12 to scan additional identifying data from the device's network. For example, the local master 14 may prompt the discovery engine 20 to scan the network of the device to determine to which type of service the device will respond. As above, this identifying data may be reported to the local master 14. The ID engine 22 may then use the previously collected identifying data to determine router and device identification. The system 10 may then compare the determined device 16 with a stored list to validate that discovered device 16 should actually be on the network.

In one exemplary implementation of the invention, hashing may be used to reduce the volume of data communicated between components in association with device discovery. For example, in an exemplary implementation, agents may be used to implement one or more of the aforementioned engines and components, and to interface with local and global masters using a reduced amount of data to minimize the overhead associated with communicating between agents and masters. For example, an agent may calculate a hash value for a device to "fingerprint" the device, and this hash value may be communicated from an agent to a master for a comparison with a stored hash value to determine what, if anything, has changed since the last time the agent communicated with the master. The hash value may be derived from a hash table that includes various entries pertaining to different types of information that classify a device. The entries in the hash table may themselves be hashes of data characterizing a device, such that the hash of the hash table is a hash taken on entries that have already been hashed.

It will be appreciated that any suitable hashing algorithm may be used to hash the data characterizing a device. It will also be appreciated that the use of hash values to uniquely represent specific information details enables agents, local masters, and global masters to communicate a relatively small amount of data to represent a relatively larger amount of information associated with the identity of a device. By doing so, the volume of data transmitted, and the network utilization requirements for device discovery are greatly reduced.

In the exemplary implementation, for example, an agent may, upon wake-up, send a broadcast to its local subnet to find all systems running compatible agents on other devices. Agents may be designed to respond to broadcasts with an agent's unique ID. An agent broadcasting a message may record the IP address of all responses and the identification of each responder. It may also be desirable to provide a dedicated port on each agent to enable the agent to listen for an "identify yourself" request from other agents.

Each agent may also be configured to perform a ping sweep of its local subset, and based upon the sweep, build a table of systems found and correlate the table against the IP addresses upon which other agents were found. A hash value may be generated based upon the sweep, with the hash value stored in an appropriate hash table entry.

Each agent may also be configured to determine if appropriate software (e.g., software application and release number) is running on the agent's machine, and to record the results in a software level file and generate a hash value that is stored in an appropriate hash table entry.

Each agent may also be configured to fingerprint its local machine, e.g., by obtaining unique data on the machine. The data, which may be weighted for different elements, may be used to generate a probability that the machine is the same machine identified in the agent's local configuration file. The types of data that may be used for fingerprinting may include, for example, CPU manufacturer, type, and stepping; disk serial number and volume ID; MAC address(es); firmware levels; vendor unique ID's; CMOS ID's; card information (e.g., SCSI card ID's and video card ID's), etc. As with other types of data, a hash value may be generated on the fingerprint data, and stored in an appropriate hash table entry. In addition, an agent may be configured to check the hash value against that generated for a last fingerprint and perform probability analysis as to whether the agent is still running on the same machine.

Once various hash values are generated, another hash value may be generated for the overall hash table, with the hash value sent to the local master along with the unique ID of the agent and the agent's local calculation as to the probability percentage that the agent's ID is correct.

Once the agent's data is sent to the local master, the agent waits for confirmation or another command from the local master. The types of commands that an agent may be responsive to include, for example, commands to send individual hashes, commands to send specific files (e.g., the software level file), commands to update the agent's unique ID, commands to update the agent's configuration file, and commands to execute an attached command file and return results.

If a local master sends a new configuration file to an agent, the agent in the exemplary implementation may determine what it's new wake-up interval is, and optionally compute a randomized offset to that interval. For example, if the wake-up interval is 120 minutes, it may be desirable to compute a random value between 1 and 120, and set the agent's next wake-up time to that number of minutes, with future wake-ups occurring at 120 minute intervals. The agent may also be configured to always record the next timestamp to wake-up, so that in the event that the agent is restarted, its initialization should determine if that timestamp has been reached or exceeded. If that is true, then the agent can run it's processing immediately and communicate, otherwise the agent can go to sleep until it's prescribed wake up time in the future.

Various types of information may be stored in an agent's configuration file, e.g., how often to communicate, the order to be used to search for masters, a randomized wake up time, and a file containing the agent's unique ID and the other information collected in the manner disclosed above (e.g., software levels, fingerprint data, other machines identified on the subset, etc.).

In the exemplary implementation, each local master is used to record all of the information received from agents that have communicated with this master, e.g., by comparing the identity by an agent and its locally calculated probability. If the probability is within the acceptable percentage, then the local master may look at its database to determine if the master has already stored information about this agent. If the master finds that unique ID in his database, then the local master may compare the overall hash value sent by the agent to the overall hash value stored in the master's database. If the two are equal, then the local master knows that all information the agent has just found has been previously communicated, and nothing has changed, so the local master can simply send an acknowledgement to the agent. If the unique ID is not in the local master's database, however, the local master may request all information to be sent by the agent and record it into the master's database.

If the probability on the ID is too low to be acceptable, then the master may be required to first look in it's local database to determine if there is a fingerprint that matches, or has a "high probability of match" to that specific fingerprint. If so, the master may reassign that unique ID to that agent, and check the hash value(s) to determine if anything has changed on this machine. If the master cannot find a match or probable match, the master may assign a "temporary Unique ID" to the agent, and request all information be sent and record it into the master's database.

If the agent was previously known, but the overall hash values do not equal, the implication would be that some piece of information the agent has found has changed, and the local master must request the contents on the hash table be sent. The individual hash values are then compared to determine which file(s) had changed, and then request those specific files be sent. The local master typically then records this new information.

Once all information has been confirmed to be the same or has been appropriately updated, then the local master may determine if the agent should change its wakeup interval, or if the agent should perform some new task, or go back to sleep. Appropriate commands for each of these operations could be sent at this time.

When a new machine is identified that does not have an agent running on it, the local master may be configured to interrogate the identified machine. This may be performed via SNMP, a NESSIS scan, or any other viable method to determine what this machine is. The results of this scan may be placed in the local master's database so that the next time an agent identifies this "new machine", the local master will know what it is.

At the end of each communication with the agent, the local master may compute a data point related to "how often am I hearing from agents on this subnet?" The master may use this data point to adjust the "wake up interval" in that agent's configuration file if it determines that it needs faster or slower updates from that subnet. The local master's goal may be to obtain information from an agent on each subnet on average every 10 minutes. If there are fewer than 10 agents on that subnet, it may never ask an agent to wake up more than once every 30 minutes.

All information that is inserted or updated in the local master may be time-stamped. This time-stamp may be used to query all "updated" information to send to a global master when the local master communicates back to the global master.

The local master may also have a configuration file that prescribes at what interval it should communicate back to it's global master. When it is time to communicate it may talk to the global master and essentially ask "when was the last time you heard from me?" It may then take that time and run a query to find all information in it's database with a time-stamp greater than that time. The result of that query may then be compressed and sent to the global master.

In the exemplary implementation, when a local master connects to a global master, the local master will request the time of last update for that local master to the global master. The global master may query that information from its database and send the last communication time to the inquiring local master. The local master may then send a file with all new information that it has learned since its last communication.

If the information provided by a local master indicates that a new "temporary Unique ID" was set by a local master, the global master may take the fingerprint information from that agent and search its database for a match or "probable match". If it finds a match, it may send that old ID back to the local master and ask that the local master "re-assign" that agent this old ID. It may update its global database with the current information for this specific unique ID. It may also record this new entry into its "history database". This history database may never update existing rows, but may instead always add a new row, allowing assets to be effectively tracked via their fingerprints and unique ID's throughout their entire life cycles. If the information provided by a local master does not match any device known to the global master, however, the global master may insert this information into its database as a new machine and the "temporary ID" may be made permanent.

While the present invention has been illustrated by a description of various embodiments and while these embodiments have been described in considerable detail, it is not the intention of the applicants to restrict, or in any way limit, the scope of the appended claims to such detail. As such, additional advantages and modifications will readily appear to those skilled in the art. The invention in its broader aspects is therefore not limited to the specific details, representative apparatus and method, and illustrative example shown and described. Accordingly, departures may be made from such details without departing from the spirit or scope of applicant's general inventive concept.

What is claimed is:

1. A method of identifying a device among a plurality of devices on a network, the method comprising:

determining identifying data associated with the device using multiple engines from among a plurality of engines, wherein each of the plurality of engines scans at least one of the network and the device to obtain the identifying data associated with the device, and wherein the identifying data includes network, hardware and software-related identifying data associated with multiple information types selected from the group consisting of: network topology information for the network, device identifier information associated with an identifier for the device, device service information associated with at least one service provided by the device, and device attribute information associated with at least one of hardware and software associated with the device;

storing the determined identifying data at a local master among a plurality of local masters;

communicating the determined identifying data to a global master in communication with the plurality of local masters and configured to store the determined identifying data; and identifying the device using the determined identifying data;

wherein determining the identifying data includes:

prompting a first engine among the plurality of engines to perform a first scan of the network to generate first identifying data associated with the device, wherein the first engine reports the first identifying data to the local master; and in the local master, receiving the first identifying data from the first engine and thereafter prompting a second engine among the plurality of engines to generate second identifying data associated with the device based upon the first identifying data reported by the first engine to the local master such that the second engine builds upon and further develops identifying data generated by the first engine.

2. The method of claim 1, wherein identifying the device further comprises correlating the determined identifying data to stored identifying data associated with the device.

3. The method of claim 1, further comprising updating the stored identifying data using the determined identifying data.

4. The method of claim 1, further comprising classifying the device as being at least one of known and unknown using the determined identifying data.

5. The method of claim 1, further comprising using the determined identifying data to determine whether to disable the device.

6. The method of claim 1, wherein identifying the device further comprises modeling the device in object hierarchy.

7. The method of claim 1, wherein determining the identifying data associated with the device further comprises determining the identifying data from within a domain assigned to the local master.

8. The method of claim 1, wherein determining the identifying data associated with the device further comprises determining a proprietary agent running on the device, wherein the proprietary agent includes a device identifier.

9. The method of claim 1, wherein determining the identifying data associated with the device further comprises determining the identifying data by scanning a range of IP addresses.

10. The method of claim 1, wherein the determined identifying data includes at least one of: protocol information, port information, and traffic information.

11. The method of claim 1, wherein the determined identifying data includes at least one of: operating system information and computer registry information.

12. The method of claim 1, wherein determining the identifying data includes hashing data characterizing the device to calculate at least one hash value, and communicating the at least one hash value to the local master as identifying data for the device.

13. The method of claim 12, wherein hashing the data characterizing the device includes:

hashing a plurality of types of information that classify the device;

storing the hashed plurality of types of information in a plurality of entries in a hash table; and hashing the plurality of entries to calculate the hash value.

14. The method of claim 1, further comprising, in an agent running on the device:

fingerprinting the device by retrieving unique data for the device to generate fingerprint data for the device;

comparing the generated fingerprint data with fingerprint data stored in a configuration file for the agent to determine whether the agent is running on the same device identified in the configuration file; and reporting to the local master a probability that the agent is running on the same device identified in the configuration file.

15. The method of claim 14, further comprising, in the agent running on the device:

hashing the generated fingerprint data to calculate a hash value for the fingerprint data; and communicating the hash value for the fingerprint data to the local master along with the probability and a unique identifier for the agent.

16. The method of claim 15, further comprising, in the agent running on the device:

communicating on a local subnet with a plurality of agents running on multiple devices among the plurality of devices to identify the plurality of agents;

performing a ping sweep to identify other devices on the local subnet;

correlating the identified agents with the identified other devices on the local subnet; and determining software running on the device.

17. An apparatus, comprising:

a global master computer configured to store identifying data associated with a device among a plurality of devices located on a network;

a plurality of local master computers distributed throughout the network and in communication with the global master computer, a first local master computer among the plurality of local master computers configured to store the identifying data; and program code executable by at least one of the first local master and the global master computer, the program code configured to determine the identifying data associated with the device and to identify the device using the identifying data, wherein the program code is configured to use multiple engines from among a plurality of engines to determine the identifying data, wherein each of the plurality of engines scans at least one of the network and the device to obtain the identifying data associated with the device, and wherein the identifying data includes network, hardware and software-related identifying data associated with multiple information types selected from the group consisting of: network topology information for the network, device identifier information associated with an identifier for the device, device service information associated with at least one service provided by the device, and device attribute information associated with at least one of hardware and software associated with the device, and wherein the program code is configured to determine the identifying data by:

prompting a first engine among the plurality of engines to perform a first scan of the network to generate first identifying data associated with the device, wherein the first engine reports the first identifying data to the local master; and in the local master, receiving the first identifying data from the first engine and thereafter prompting a second engine among the plurality of engines to generate second identifying data associated with the device based upon the first identifying data reported by the first engine to the local master such that the second engine builds upon and further develops identifying data generated by the first engine.

18. The apparatus of claim 17, wherein the program code is configured to determine the identifying data associated with the device by determining information consisting of at least one of: protocol information, port information, traffic information, operating system information, a serial number, a proprietary identifier, an IP address, router information, a Media Access Control address, a Domain Name System name, computer registry information.

19. The apparatus of claim 17, wherein at least one of the local master computers is remote from the global master computer.

20. The apparatus of claim 17, wherein the program code is configured to correlate the identifying data to stored identifying data associated with the device.

21. The apparatus of claim 17, wherein the program code is configured to update the stored identifying data using the determined identifying data.

22. The apparatus of claim 17, wherein the program code is configured to classify the device as being at least one of known and unknown using the determined identifying data.

23. The apparatus of claim 17, wherein the program code is configured to use the determined identifying data to determine whether to the device should be disabled.

24. The apparatus of claim 17, wherein the program code is further configured to identify the device is within a domain of the local master computer.

25. A non-transitory computer readable medium, comprising:
program code stored on the non-transitory computer readable medium and in communication with at least one of a local master and a global master computer, the program code configured upon execution to determine identifying data associated with a device among a plurality of devices located on a network and to identify the device using the identifying data, wherein the global master computer is configured to store identifying data associated with the device, wherein the global master computer is in communication with a plurality of local master computers distributed throughout the network, and wherein at least one local master computer is configured to store the identifying data, wherein the program code is configured to use multiple engines from among a plurality of engines to determine the identifying data, wherein each of the plurality of engines scans at least one of the network and the device to obtain the identifying data associated with the device, and wherein the identifying data includes network, hardware and software-related identifying data associated with multiple information types selected from the group consisting of: network topology information for the network, device identifier information associated with an identifier for the device, device service information associated with at least one service provided by the device, and device attribute information associated with at least one of hardware and software associated with the device, and wherein the program code is configured to determine the identifying data by:
prompting a first engine among the plurality of engines to perform a first scan of the network to generate first identifying data associated with the device, wherein the first engine reports the first identifying data to the local master; and
in the local master, receiving the first identifying data from the first engine and thereafter prompting a second engine among the plurality of engines to generate second identifying data associated with the device based upon the first identifying data reported by the first engine to the local master such that the second engine builds upon and further develops identifying data generated by the first engine.

26. An apparatus, comprising:
a local master computer in communication with a global master computer, the local master computer configured to store the identifying data associated with a device among a plurality of devices located on a network; and
program code executable by the local master, the program code configured to determine the identifying data associated with the device and to identify the device using the identifying data, wherein the program code is configured to use multiple engines from among a plurality of engines to determine the identifying data, wherein each of the plurality of engines scans at least one of the network and the device to obtain the identifying data associated with the device, and wherein the identifying data includes network, hardware and software-related identifying data associated with multiple information types selected from the group consisting of: network topology information for the network, device identifier information associated with an identifier for the device, device service information associated with at least one service provided by the device, and device attribute information associated with at least one of hardware and software associated with the device, wherein the program code is configured to determine the identifying data by:
prompting a first engine among the plurality of engines to perform a first scan of the network to generate first identifying data associated with the device, wherein the first engine reports the first identifying data to the local master; and
in the local master, receiving the first identifying data from the first engine and thereafter prompting a second engine among the plurality of engines to generate second identifying data associated with the device based upon the first identifying data reported by the first engine to the local master such that the second engine builds upon and further develops identifying data generated by the first engine.

* * * * *